Sept. 6, 1938.  C. L. WYND ET AL  2,129,456
COMPOSITE CELLULOSE DERIVATIVE SHEETING
Filed Oct. 4, 1934
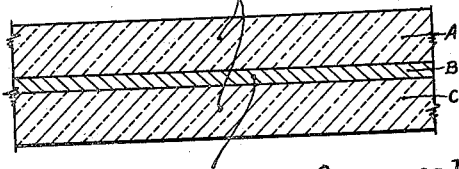
Transparent Cellulose Derivative Layers
Translucent or Opaque Layer of Cellulose Derivative.
Inventors:
Clarence L. Wynd &
William H. Groth,
By Newton M. Perrins
Daniel I. Mayoe
Attorneys.

Patented Sept. 6, 1938

2,129,456

UNITED STATES PATENT OFFICE 2,129,456

COMPOSITE CELLULOSE DERIVATIVE SHEETING

Clarence L. Wynd and William H. Groth, Rochester, N. Y., assignors, by mesne assignments, to Eastman Kodak Company, Jersey City, N. J., a corporation of New Jersey Application October 4, 1934, Serial No. 746,862

6 Claims. (Cl. 154—2)

This invention relates to opaque or translucent cellulose derivative sheeting, and more particularly to a composite cellulose derivative sheeting having a high degree of flexibility.

Heretofore, in the production of opaque or translucent cellulose derivative sheeting it has been the custom to obtain opacity or translucency by incorporating pigments, such, for example, as zinc oxide, barium sulphate, titanium oxide and similar agents with the material from which the sheeting is produced. One way of producing such a sheeting is to mix the desired pigment with a cellulose nitrate or cellulose acetate dope and then coat the pigmented solution into the form of a sheet on a suitable film-forming surface. While a white opaque or translucent sheet could be produced in this manner, it was found that such sheeting possessed a low degree of flexibility, presumably because of the discontinuity of the material due to the presence of the pigment particles therein.

We have now discovered a method whereby a composite, opaque or translucent cellulose derivative sheeting may be produced which possesses an unusually high degree of flexibility and in which it is not necessary to employ pigments or any other type of solid material in order to obtain the opaque or translucent effect.

It is, accordingly, the principal object of our invention to overcome the defects of the prior art processes and products, as above pointed out, and to provide a method for producing a highly flexible and satisfactory type of opaque or translucent cellulose derivative sheeting. A further object is to produce an opaque or translucent cellulose derivative sheeting in which the desired degree of opacity or translucency may be obtained without the use of pigments or other solid materials. A still further object is to produce a new type of flexible composite cellulose derivative material having an inner layer of opaque or translucent character. Other objects will appear hereinafter.

The above objects are accomplished by our invention which, in its broadest aspects, comprises coating the surface of a preformed transparent cellulose derivative sheet with a thin layer of cellulose derivative solution, coagulating this thin layer in a humid atmosphere, such as an atmosphere of steam, water, or even of cellulose derivative non-solvent, whereby a white opaque or translucent coating is produced on the transparent sheet and thereafter uniting a second transparent sheet to the opaque coating layer of the first sheet.

In the following example and description, we have set forth several of the preferred embodiments of our invention, but it will be understood that they are included merely for purposes of illustration and not as a limitation thereof.

According to one form of our invention, we coat the surface of a preformed transparent sheet of cellulose derivative material, such as cellulose acetate with a thin layer of a cellulose derivative film-forming solution, for example, a solution of cellulose nitrate in appropriate solvents. The coating operation may be carried out continuously in connection with the manufacture of the sheeting itself, or may be carried out as a discontinuous operation in which a preformed sheet of transparent material is coated with the film-forming solution. In either case, the coated sheet material is immediately passed into a moist atmosphere, such as an atmosphere of saturated steam, which brings about coagulation of the film-forming layer. During this coagulating action, a certain amount of precipitation of the cellulose derivative material takes place with the result that a thin white opaque or translucent coating is produced upon the transparent sheet. This opaque or translucent layer of precipitated cellulose derivative is very porous and brittle and would not withstand the frictional or abrasive influences to which the sheeting would ordinarily be subjected during use. It is therefore necessary to apply a protective layer thereover. According to our invention, a second transparent cellulose derivative sheet is applied to the coated sheet, being cemented to the surface of the white opaque or translucent layer of precipitated material by an appropriate cement. It has been found by appropriate tests that such a sheeting possesses a much higher degree of flexibility than opaque or translucent sheeting produced by incorporating pigments within the body of the sheeting itself.

The single figure of the accompanying drawing illustrates a cross-section through a sheet prepared in accordance with our invention as outlined in the preceding paragraphs from which it will readily be observed that our product is a composite sheet characterized by the fact that it comprises a translucent or opaque internal layer of precipitated cellulose derivative material. Specifically, the sheet comprises two transparent cellulose derivative sheets A and C, which may be composed of any appropriate cellulose derivative material such as cellulose nitrate, cellulose acetate, and the like, between which is interposed and joined thereto the thin translucent or opaque layer B of the precipitated cellulose derivative material.

Many modifications of our process and product are possible within the scope of our invention. For example, instead of using steam in the coagulation of the layer of cellulose derivative material which is deposited on the original sheet, it is possible to use a coagulating bath of warm or even cold water, cold water sometimes being preferred to water in the vapor form. It is also possible, according to our invention, to employ a cellulose derivative non-solvent in vapor or liquid form to coagulate the deposited layer and occasion precipitation or incipient precipitation of the cellulose derivative material.

With respect to the product, it is within the scope of our invention to employ a plurality of translucent or opaque layers of precipitated cellulose derivative material, although ordinarily one will suffice to give the desired degree of translucency or opacity. In such a structure, instead of employing two sheets of transparent cellulose derivative material, three or more such sheets are employed, appropriate layers of precipitated cellulose derivative material being interposed therebetween and the respective layers appropriately united by means of a suitable cement.

In the above description no details of the manufacture of the transparent sheeting itself are given, such matters being well within the knowledge of those skilled in the art to which this invention relates. Although almost any type of cellulose derivative sheeting may be employed in our invention, we find cellulose acetate sheeting to be particularly desirable. We may, however, employ other types of sheeting such as those produced from other cellulose derivatives such as cellulose propionate, cellulose butyrate and cellulose stearate as well as cellulose acetate propionate, cellulose acetate butyrate, and cellulose acetate stearate. Likewise cellulose ether sheeting may be employed. As is usual in this type of sheeting, which may run in thickness from a few thousandths of an inch to a sheet of appreciable thickness, say of the order of a few hundredths of an inch, various plasticizers may be employed to give the sheet material the desired degree of flexibility. These plasticizers will, of course, be selected upon the basis of the particular cellulose derivative dealt with, as is well known.

The transparent sheet which is laid over the opaque or translucent precipitated cellulose derivative layer as a protective covering may be either in the form of a preformed sheet, or may be simply a coating of clear transparent dope which, upon evaporation of solvents, forms the desired protective layer thereon.

From the above description it will be evident that many different combinations of cellulose derivative materials may be employed in producing the composite sheeting of our invention. For example, the first transparent sheet may be of cellulose acetate, the thin opaque or translucent layer may consist of precipitated cellulose nitrate, while the top sheet or layer may consist of cellulose acetate or other cellulose derivative, such as cellulose nitrate or others of the single or mixed esters or ethers of cellulose.

The composite sheeting of our invention is adapted for many uses. For example, it may be employed in the photographic industry in the preparation of artistic portraits which may be used as transparencies, especially when the material is of a translucent character. The material may also be used for manufacture of view windows for photographic cameras, for tracing paper as used in mechanical drafting, and for many other similar purposes.

Having thus described our invention, what we declare is new and desire to secure by Letters Patent of the United States is:

1. The method of making translucent or opaque cellulose derivative sheeting which comprises coating a transparent cellulose derivative sheet with a thin layer of a cellulose derivative solution and simultaneously coagulating the layer and causing incipient precipitation of the cellulose derivative material therein by evaporating solvent therefrom in the presence of steam, whereby a substantially continuous and permanent translucent or opaque coating is produced on the sheet, and thereafter uniting a transparent cellulose derivative protective layer to the sheet over the precipitated layer.

2. The method of making translucent or opaque cellulose nitrate sheeting which comprises coating a transparent cellulose nitrate sheet with a thin layer of a cellulose derivative solution and simultaneously coagulating the layer and causing incipient precipitation of the cellulose derivative material therein by evaporating solvent therefrom in the presence of steam and thereafter uniting a transparent cellulose derivative protective layer to the sheet over the precipitated layer.

3. The method of making translucent or opaque cellulose nitrate sheeting which comprises coating a transparent cellulose nitrate sheet with a thin layer of a cellulose nitrate solution and simultaneously coagulating the layer and causing incipient precipitation of the cellulose derivative material therein by evaporating solvent therefrom in the presence of steam and thereafter uniting a transparent cellulose derivative protective layer to the sheet over the precipitated layer.

4. The method of making translucent or opaque cellulose acetate sheeting which comprises coating a transparent cellulose acetate sheet with a thin layer of a cellulose acetate solution and simultaneously coagulating the layer and causing incipient precipitation of the cellulose derivative material therein by evaporating solvent therefrom in the presence of steam and thereafter uniting a transparent cellulose derivative protective layer to the sheet over the precipitated layer.

5. The method of making translucent or opaque cellulose derivative sheeting which comprises coating a transparent cellulose derivative sheet with a thin layer of a cellulose derivative solution and simultaneously coagulating the layer and causing incipient precipitation of the cellulose derivative material therein by evaporating solvent therefrom in the presence of a humid atmosphere containing an amount of moisture sufficient to cause incipient precipitation of the cellulose derivative material of the layer, whereby a substantially continuous and permanent translucent or opaque coating is produced on the sheet, and thereafter uniting the transparent cellulose derivative protective layer to the sheet over the precipitated layer.

6. The method of making translucent or opaque cellulose derivative sheeting which comprises coating a transparent cellulose derivative sheet with a thin layer of a cellulose derivative solution and evaporating solvent therefrom in the presence of an atmosphere containing a non-solvent precipitant of the cellulose derivative material and thereby simultaneously coagulating the layer and causing incipient precipitation of the cellulose derivative material therein, whereby a substantially continuous and permanent translucent or opaque coating is produced on the sheet, and thereafter uniting a transparent cellulose derivative protective layer to the sheet over the precipitated layer.

CLARENCE L. WYND.
WILLIAM H. GROTH.